United States Patent [19]

Strauss

[11] Patent Number: 6,057,844
[45] Date of Patent: May 2, 2000

[54] DRAG OPERATION GESTURE CONTROLLER

[75] Inventor: Randolph A. Strauss, Mountain View, Calif.

[73] Assignee: Adobe Systems Incorporated, San Jose, Calif.

[21] Appl. No.: 08/847,815

[22] Filed: Apr. 28, 1997

[51] Int. Cl.$^7$ .................................................. G06F 3/00
[52] U.S. Cl. ........................ 345/358; 345/145; 345/348; 345/354; 345/347; 345/339
[58] Field of Search ................................. 345/145, 348, 345/354, 347, 352, 339, 346, 358

[56] References Cited

U.S. PATENT DOCUMENTS

| | | | |
|---|---|---|---|
| 5,608,860 | 3/1997 | Fitzpatrick et al. ................... | 345/352 |
| 5,646,647 | 7/1997 | Chow ...................................... | 345/145 |
| 5,721,853 | 2/1998 | Smith ..................................... | 345/353 |
| 5,774,119 | 6/1998 | Alimpich et al. ...................... | 345/340 |
| 5,805,167 | 9/1998 | Van Cruyningen .................... | 345/353 |
| 5,850,212 | 12/1998 | Nishibori .............................. | 345/160 |
| 5,852,440 | 12/1998 | Grossman et al. .................... | 345/348 |
| 5,867,163 | 2/1999 | Kurtenbach ........................... | 345/354 |

OTHER PUBLICATIONS

Kabbash, Paul, et al, "Two–Handed Input in a Compound Task", unpublished paper to appear in the *Proceedings of CHI '94*.

*Primary Examiner*—Raymond J. Bayerl
*Assistant Examiner*—Cuong T. Thai
*Attorney, Agent, or Firm*—Fish & Richardson P.C.

[57] ABSTRACT

A method and system for refining the function performed by a drag operation during the drag operation. After a drag operation begins, a "Drag Toolbar" appears with controls that change the current function of the drag operation when the cursor is moved over a selected control. In the preferred embodiment, the controls are mutually exclusive "radio buttons". However, the controls may be cumulative "check boxes", or incrementing/decrementing, or allow navigation, or otherwise permit object manipulation. The Drag Toolbar may be fixed in place or be a floating palette, may be of various shapes and forms. Selection of a control from the Drag Toolbar may be indicated in any of various manners. The depiction of the cursor may be changed as controls are selected during the drag operation to further indicate which control has been selected. In another embodiment, the Drag Toolbar may be floating and have a "follow me" characteristic, where the Drag Toolbar moves so as to always be within a certain distance from the cursor. The invention provides an unambiguous way for a user to change the drag functionality of a cursor during a drag operation. Thus, a user need not memorize different keyboard modifier combinations. Further, the graphical user interface is not cluttered, since the Drag Toolbar only appears when a drag operation is initiated. The invention can be used for other applications as well, such as drawing mode changes.

11 Claims, 7 Drawing Sheets

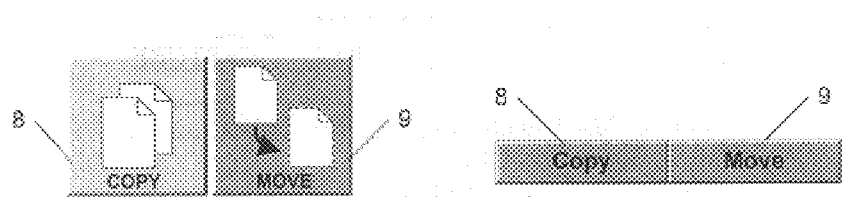
FIG. 2A    FIG. 2B
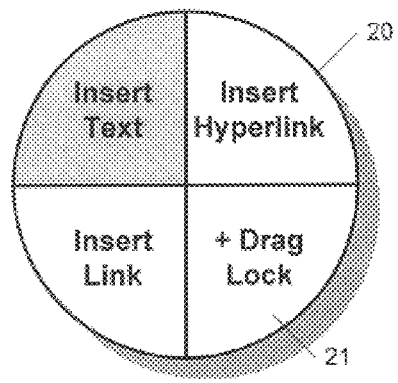
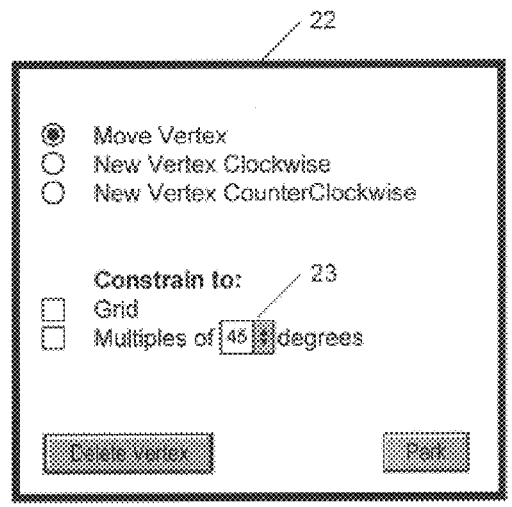
FIG. 3a    FIG. 3b
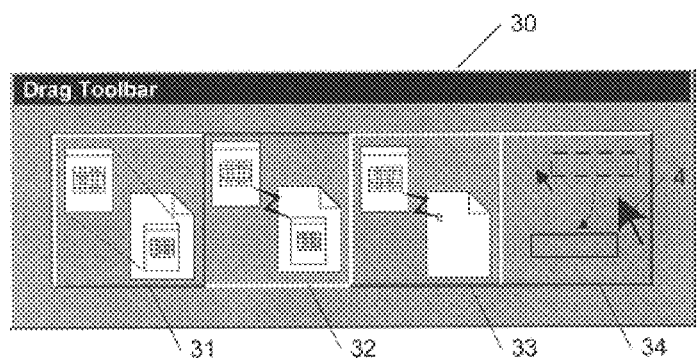
FIG. 4

DRAG OPERATION GESTURE CONTROLLER

BACKGROUND OF THE INVENTION

1. Field of the Invention

This invention relates to computer interfaces, and more particularly to a gesture control system for improved drag operation of a pointing device used with a graphical user interface.

2. Description of Related Art

Graphical user interfaces ("GUIs") typically use a pointing device (such as a mouse, light pen, or stylus on a touch-sensitive display screen) to select an object (e.g., text, figures, areas of a display screen, files, folders or directories, object tools, parts of figures or other objects such as vertices and edges, etc.) under a cursor and then "drag" the selected object to a different location or orientation on a display screen. The user may then "drop" or release the object at a desired new location or orientation indicated by the position of the cursor.

Selecting is usually a first step, generally initiated by holding down a button associated with the pointing device (e.g., a mouse button) and gesturing with the pointing device to indicate the bounds of the object to be selected (as in text selection), or simply by "clicking" on the object under the cursor (as in selecting a graphical image or icon). Selection is typically indicated by a change in the visual display of the selected object (e.g., by using reverse video, displaying a frame around the object, displaying selection handles around the object, etc.).

Dragging is usually a separate step distinct from selection, and is usually initiated by clicking on a selected object and holding a control button down (e.g. holding a mouse button in a depressed state). The object is then dragged while holding the control button.

However, in some applications, initiating dragging also selects the object under the cursor. The operation is completed by dropping the selected object.

For many applications, a drag operation may be used to initiate several possible functions relative to an object. For example, in a text application, a selected section of text may be moved or copied by a drag operation. As another example, in a page layout program such as Adobe Framemaker®, a selected file may be inserted into a document by embedding (i.e., copying the content of the object), by linking (i.e., referencing the content of the object such that changes to the original appear in the linking document), or by reference (e.g., establishing a hypertext link to the object).

Normally, if multiple functions are possible, one such function (e.g., moving) is a "default" function of a drag operation, while the other functions must be selected by some combination of modifiers (e.g., pressing keys like "SHIFT", "ALT", and "CTRL") while operating the pointing device. However, there are a finite number of such combinations available, and none are particularly intuitive. Indeed, some applications have adopted contrary or confusing combinations. For example, in Microsoft Windows95®, dragging a file object to a directory icon on the same storage device initiates a MOVE function by default, but can be changed to a COPY function if the CTRL key is pressed before dropping the file object. However, dragging a file object to a directory icon on a different storage device initiates a COPY function by default, but can be changed to a MOVE function if the SHIFT key is pressed before dropping the file object.

In some applications, after completing the drag operation, a menu automatically pops up to allow a user to choose a specific "drop" function. However, such menus do not allow changing the nature of the drag operation before dropping.

Accordingly, the inventor has concluded that it would be desirable if a more intuitive method and system existed for selecting among multiple functions during a drag operation, allowing a user to change a gesture after it has begun. The present invention provides such a method and system.

SUMMARY OF THE INVENTION

The invention is a method and system for refining the function performed by a drag operation during the drag operation. After a drag operation begins, a "Drag Toolbar" appears with icon or button controls that change the current function of the drag operation when the cursor is moved over a selected control. In the preferred embodiment, the controls are radio button controls, and thus are mutually exclusive. However, in an alternative embodiment, the controls may be cumulative (ie., multiple controls may be active, similar to check box controls), or incrementing/decrementing (e.g. a control may cause the displayed page in a document to change up or down each time the control is activated, or while the cursor remains over the control), or allow navigation (e.g., "screen down", "page up", "end of document", "next column", etc.), or otherwise permit object manipulation.

The Drag Toolbar may be fixed in place or be a floating palette, may be of various shapes, and may comprise simple text labeled buttons, labeled or unlabeled icons, or unlabeled icons with a "tool tip" help display (a tool tip is a small pop-up field of help text that appears near the cursor if the cursor lingers over a control or active area). Selection of a control from the Drag Toolbar may be indicated in any of various manners, such as by highlighting, setting or clearing of check boxes and radio buttons, display of a status line for the Drag Toolbar, etc. If desired, the depiction of the cursor is changed as controls are selected during the drag operation to further indicate which control has been selected. In another embodiment, the Drag Toolbar may be floating and have a "follow me" characteristic, where the Drag Toolbar moves so as to always be within a certain distance from the cursor, for convenience of close access.

One of the principal advantages of the invention is that it provides an unambiguous way for a user to change the drag functionality of a cursor during a drag operation. Thus, a user need not memorize different keyboard modifier combinations, as in the prior art Further, the graphical user interface is not cluttered, since the Drag Toolbar only appears when a drag operation is initiated. The invention can be used for other applications as well, such as drawing mode changes.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2A is a graphical depiction of icon labeled control buttons in accordance with the invention.

FIG. 2B is a graphical depiction of text labeled control buttons in accordance with the invention.

FIG. 3a is a graphical depiction of a circular Drag Toolbar having four control buttons.

FIG. 3b is a graphical depiction of an alternative Drag Toolbar.

FIG. 4 is a graphical depiction showing a Drag Toolbar having four control buttons.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1A:
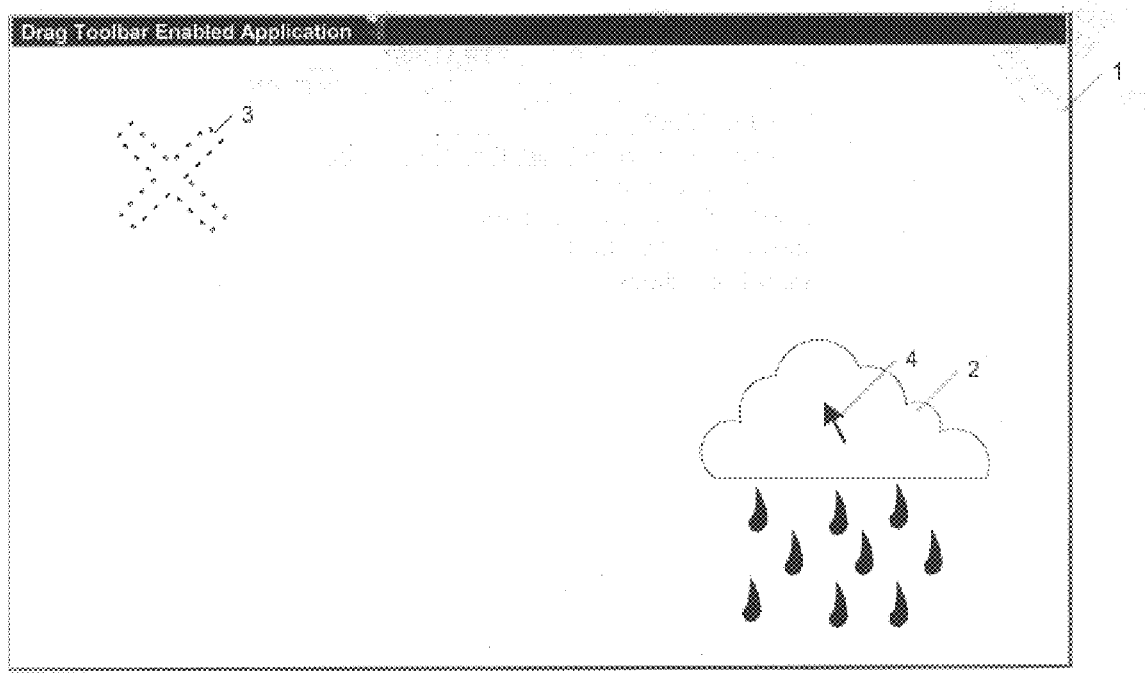
FIGS. 1A–1E are a sequence of related block diagrams showing a graphical user interface implementing one form of the present invention.

FIGS. 1A–1E are block diagrams showing a graphical user interface 1 implementing one form of the present invention. FIG. 1A shows an application having a graphic image 2 of clouds in the lower right hand corner, and a drop spot 3, indicated by a large dotted "X" (in an actual implementation, of course, no "X" would appear), that is to be the terminal location of a drag operation. A user commences the drag operation by placing the cursor 4 over the graphic image 2 and initiating a drag operation on the graphic image 2. In some applications, the user would select the graphic image 2 (e.g., by clicking with a mouse button), and then select and hold (e.g., by depressing a mouse button) to indicate dragging. In other applications, the user can select and hold in one operation to initiate dragging.

Figure 1B:
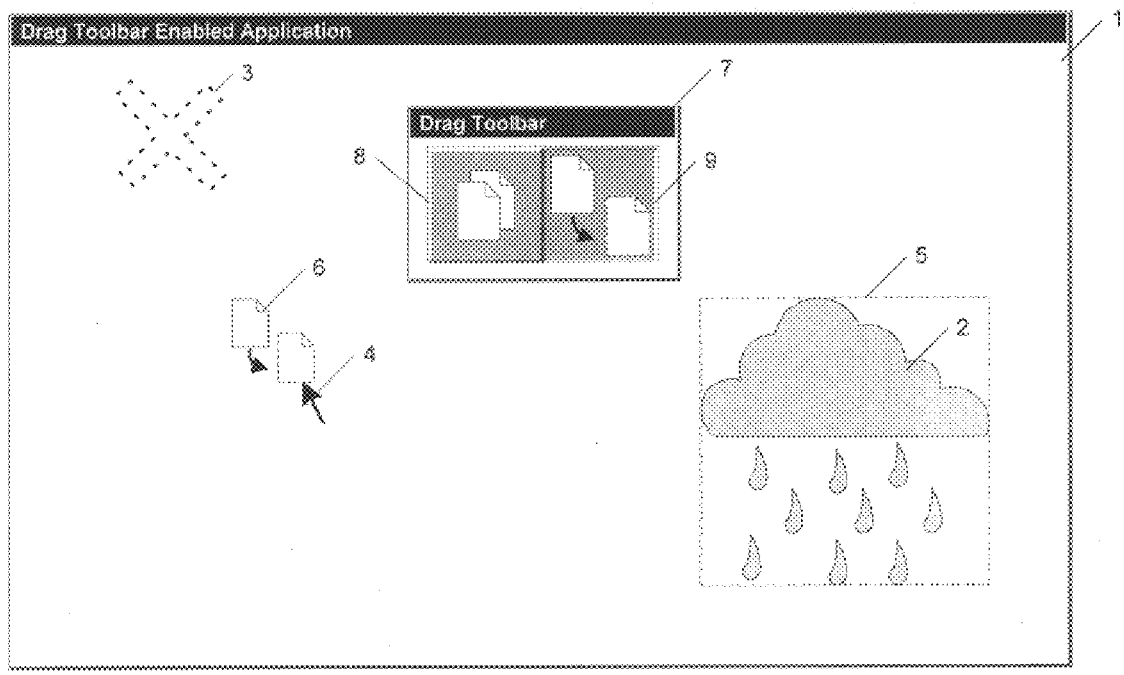

FIG. 1B shows that selecting the graphic image 2 results in a visual change in the appearance of the graphic image 2 to indicate that it has been selected, and drawing of a frame 5 around the graphic image 2 to indicate the bounds of the graphic image 2. In this example, the depiction of the cursor 4 changes to include an icon 6 that indicates that the default action of the drag operation will be a MOVE function.

In accordance with the preferred embodiment of the invention, a "Drag Toolbar" 7 is displayed at the commencement of the drag operation. In alternative embodiments, the Drag Toolbar 7 does not display until the cursor 4 passes over a static icon (e.g., on a standard toolbar), or until the cursor 4 stops moving for awhile.

In the embodiment depicted in FIG. 1B, the Drag Toolbar 7 has two control buttons 8, 9, representing a COPY function and a MOVE function, respectively. In the illustrated embodiment, the MOVE control button 9 is drawn so as to appear that it has been pressed, similar to known radio button depictions.

Figure 1C:
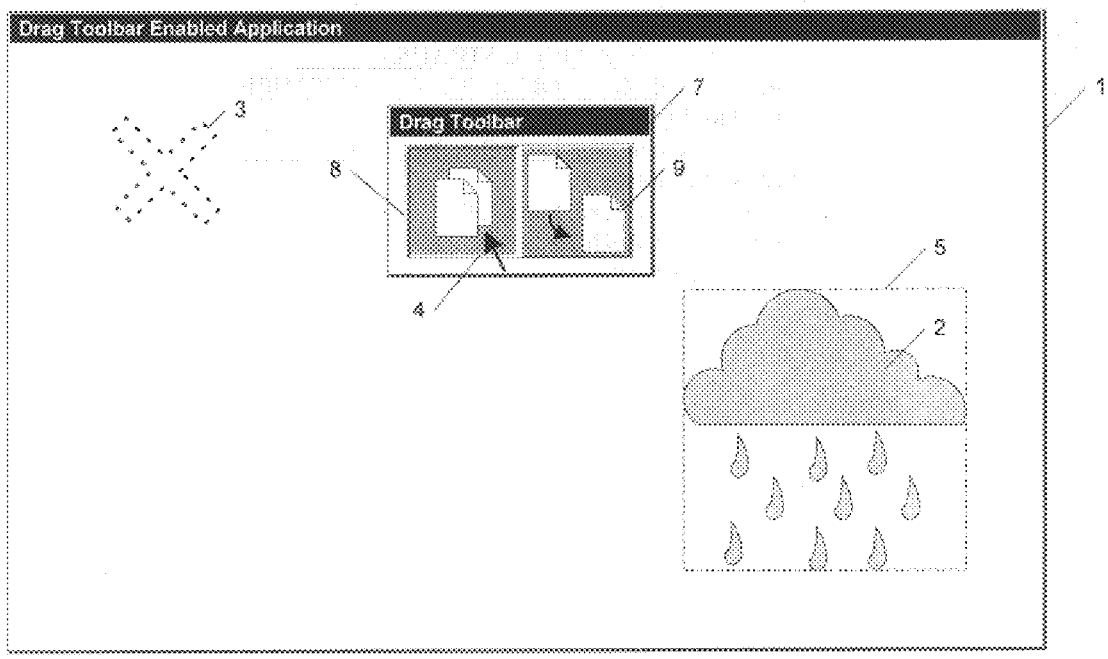

FIG. 1C shows that the user has moved the cursor 4 over the COPY control button 8, thus creating a detectable event that selects that function to replace the default MOVE function for the drag operation. The COPY control button 8 has been redrawn to depict it as having been pressed, while the MOVE control button 9 has been redrawn to depict it as being unpressed, again in known radio button fashion. In an alternative embodiment, the user would actively select (e.g., by a click of a different mouse button or by releasing the currently depressed mouse button and pressing it again) on the desired function rather than simply place the cursor 4 over it.

For the sake of clarity, the depiction of the cursor 4 changes between FIGS. 1B and 1C so that the icon 6 does not obscure the control buttons during selection of the COPY control button 8, as shown in FIG. 1C. However, if desired, the icon 6 can be retained until the new control button is selected.

Figure 1D:
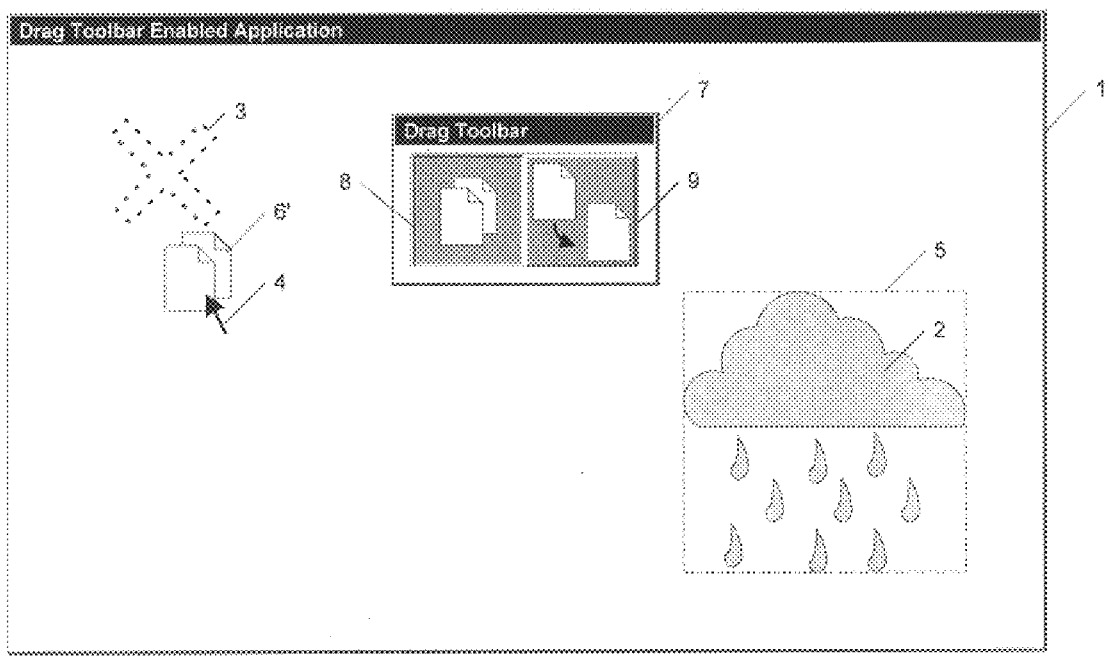

In FIG. 1D, the cursor 4 is now depicted with a new icon 6' that represents the COPY function assigned to the cursor 4. The user has moved the cursor 4 closer to the indicated drop spot 3.

Figure 1E:
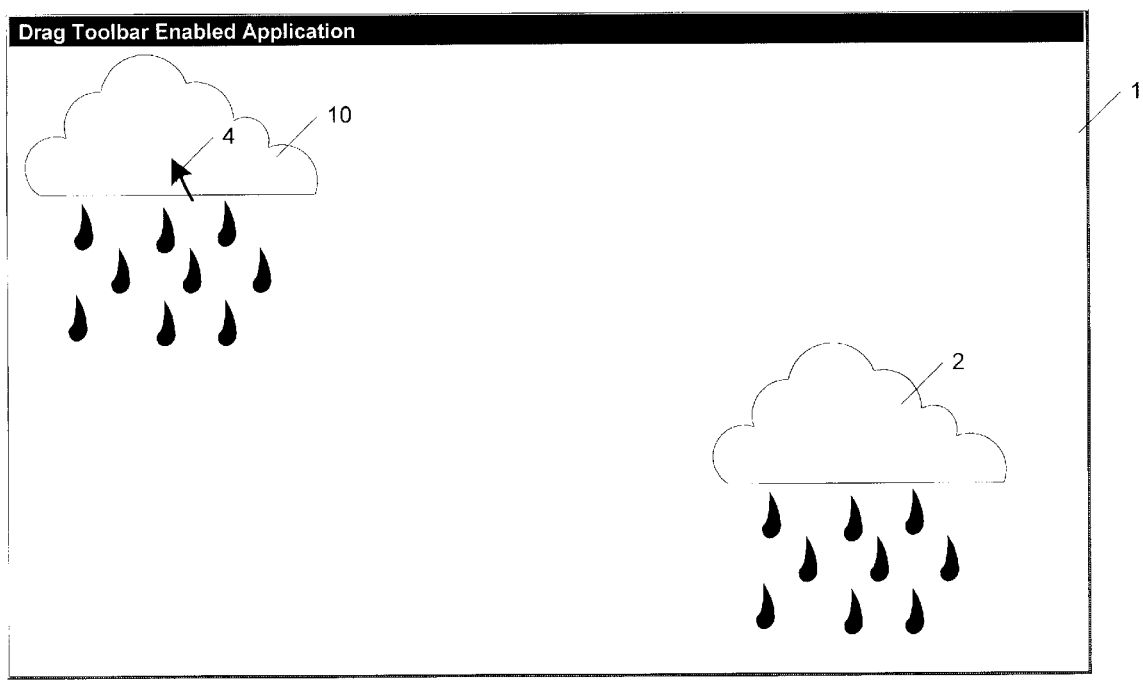

FIG. 1E shows that the user has released the drag function of the cursor 4 (for example, by releasing a depressed mouse button) so that a copy 10 of the original graphic image 2 is now positioned on the graphical user interface 1 as shown.

The Drag Toolbar 7 shown in FIGS. 1B–1D can be represented in many different ways. For example, while FIG. 1B shows a Drag Toolbar 7 having a fame surrounding several control buttons 8, 9, the control buttons 8, 9 can be depicted without a frame, as in FIG. 2A, or as simple labeled buttons, as in FIG. 2B. Icon-based buttons can have labels, such as in FIG. 2A, or not have labels, as in FIG. 1B.

In the latter case, "tool tip" labels that only appear when the cursor 4 lingers over a control button 8, 9 for a short time can be used to inform a user of the function of each icon.

The Drag Toolbar contemplated by the invention need not necessarily be rectangular. For example, FIG. 3a shows that a circular Drag Toolbar 20 having four control buttons. Further, the Drag Toolbar need not be graphical or may use conventional selection controls. For example, FIG. 3b is a graphical depiction of an alternative Drag Toolbar 22 that might be used with a drawing program. The top of the Drag Toobar 22 shows three mutually exclusive choices ("radio buttons"), with the selected choice being filled in. The "Move Vertex" field is selected as the default function when a user begins dragging a vertex of a graphical object. If the user selects the "New Vertex Clockwise" option, the originally-selected vertex is replaced at its original location and a new vertex appears under the cursor, attached clockwise from the originally-selected vertex. The "New Vertex CounterClockwise" option works similarly in the other direction. A "Delete Vertex" option area allows the user to delete a single selected vertex by simply moving the cursor over the indicated area and dropping the vertex.

The middle of the Drag Toolbar 22 shows two types of independent ("check box") drawing constraints. In the illustrated embodiment, the second constraint requires user selection of a value in an input field 23. To accommodate this feature, a Park area is provided at the bottom of the Drag Toolbar 22 where a user can "park" a dragged object temporarily (e.g., by placing the object over the Park area and releasing the mouse button) in order to move the cursor to the input field 23 and enter a new value. A parked object can be picked up again by, for example, placing the cursor over the object and pressing a mouse button.

In most cases, the control buttons of the Drag Toolbar will be radio buttons, meaning that only one button can be selected at a time, and selection of a button de-selects any previously selected button. The selection and de-selection of control buttons may be depicted in any convenient manner, such as by shading a selected button differently from a de-selected button (as in FIG. 2A and FIG. 3a), or by drawing a selected button as "pressed" (as in FIGS. 1B–1D).

If the number of functions is small, a single control button can be used, with its function indicated by an icon and/or label that cycles through a small set of choices. For example, if the default behavior of a drag operation is MOVE, a single control button indicating COPY can be displayed. Dragging a current object over the single control button changes the cursor function to COPY, and cycles the control button to display MOVE. Backing the cursor out of the control button and then moving the cursor back over the control button would again change the function of the cursor, this time back to MOVE, and cycle the control button back to COPY. While this mode does have the advantage of taking up little space on a display, it is not particularly preferred, since the user may not have advance knowledge of all of the choices in a cycle, and may interpret the button to be showing the current function rather than showing a new option. However, this problem may be alleviated by showing an indicator, such as "1 of 3", as part of the control to indicate that additional options are available.

While the preferred embodiment uses a radio button model for the Drag Toolbar, in some applications it may be desirable to have multiple buttons apply simultaneously. For example, FIG. 3a shows a circular Drag Toolbar 20 that has three mutually exclusive control buttons ("Insert Text", "Insert Hyperlink", and "Insert Link"), and a cumulative button 21 that can be added to the function of any of the other three buttons. In the illustrated embodiment, the cumulative button 21 is a drag lock control button that, when selected, allows a user to cease manually depressing the drag control button (e.g., a button on a mouse) while gesturing with the pointing device. In such an embodiment, when the user is ready to drop or release the selected object, the user can "click" the original drag button on the pointing device. Implementing the function of a drag lock is well known in the art.

In an alternative embodiment, the controls may be incrementing/decrementing (e.g., a control may cause the displayed page in a document to change up or down each time the control is activated, or while the cursor remains over the control) or allow navigation (e.g., "screen down", "page up", "end of document", "next column", etc.). Indeed, in at least one mode of operation, the invention can be used during the selection process as well as during drag operations, as when selection requires gesturing over some area (e.g., text selection). For example, in many applications, to begin selecting text, a user must position the cursor at a start point, press and hold a control button on the pointing device (e.g., a mouse button), and move the pointing device to the end of the desired selection. Since this mode is essentially the same as a drag operation on an object that is selected by a single click or simply be initiating dragging, a Drag Toolbar can be made to appear during such a text or area selection process as well. Such a Drag Toolbar may have control buttons for "end of paragraph", "end of page", "end of chapter", "end of document", etc., as appropriate to the application.

FIG. 4 is a graphical depiction showing a Drag Toolbar 30 having four control buttons. An EMBED control button 31 copies an object into a designated document A LINK control button 32 establishes a "live" link between a current document and an object, such that changes in the object are reflected, via a linkage, in the target document A REFERENCE control button 33 (e.g., a hyperlink button) generates an icon in a target document that, when clicked on, accesses a referenced document.

Also shown in FIG. 4 is a "SCAT" button 34 which allows a user to move a Drag Toolbar 30 out of the way if the Drag Toolbar 30 is presently positioned over a desired drop point. To activate, the user moves the cursor 4 over the SCAT button 34, which moves the Drag Toolbar 30 some distance away from the cursor 4 and then deactivates until activated again. Implementation of such a SCAT function is well known in the art As an alternative to a SCAT button 34, a HIDE button can be used to make the Drag Toolbar 30 disappear momentarily so that a drop can be finished at a location previously covered by the Drag Toolbar 30. As yet another alternative, one or more sides of the Drag Toolbar 30 can be made "nudge" sides, such that the Drag Toolbar 30 moves aside if the cursor 4 approaches from that side, while one or more "open" or "non-nudge" sides allow entry by the cursor 4 into the Drag Toolbar 30. As still another alternative, the Drag Toolbar 30 may have a "hook" control that allows the Drag Toolbar 30 to be itself dragged around the display during a drag operation. For example, the "hook" control might be shaped like a "C", such that moving the cursor 4 into the opening of the control engages a drag function for the Drag Toolbar 30; moving the cursor 4 back out of the opening disengages that drag function. Comparable approaches for all of these functions may also be used.

Figure 5A:
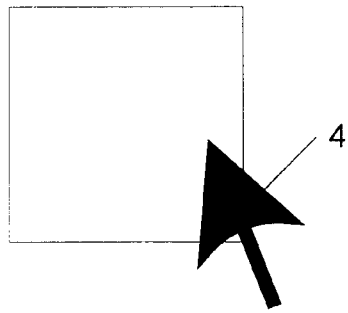
FIG. 5A is a graphical depiction of a prior art cursor with object outline.
Figure 5B:
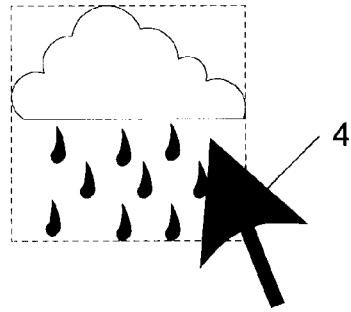
FIG. 5B is a graphical depiction of a prior art cursor with dragged object.
Figure 6A:
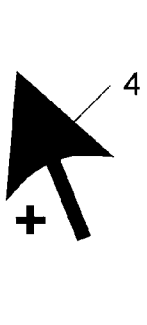
FIGS. 6A–6B are graphical depictions of a prior art cursor indicating a COPY function.
Figure 6B:
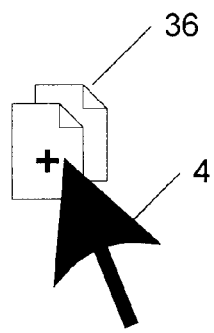
Figure 6C:
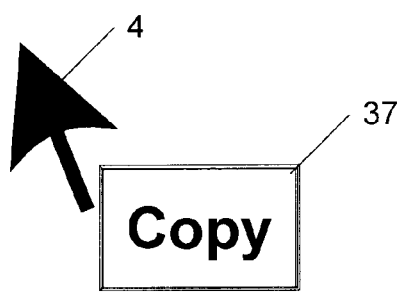
FIG. 6C is a graphical depiction of a cursor indicating a COPY function.

During a drag operation, the cursor 4 can be changed to suggest to a user the type of operation that will result from dropping an object. For example, in FIGS. 1B and 1D, icons are used to indicate whether the drag operation would result in a MOVE function (FIG. 1B) ora COPY operation (FIG. 1D). However, as is known in the prior art, the cursor can be depicted as dragging a frame that bounds an object, as shown in FIG. 5A, or a copy of the object itself, as shown in FIG. 5B. In the case of the cursors 4 shown in FIGS. 5A and 5B, additional symbols may be added to indicate the current function of the drag operation. For example, in FIG. 6A, a "+" is added to the cursor to indicate a COPY function. Similarly, FIG. 6B shows that the "+" symbol has been added to an icon 36. FIG. 6C shows a text label 37 that indicates the current function of the cursor 4. In general, the cursor 4 can be changed in any desired fashion to suggest to a user the current functionality of the drag operation.

A Drag Toolbar may be displayed in a fixed position at each invocation, which has the advantage of allowing a user to always look in the same place for control buttons to change the drag functionality of the cursor. In this case, the Drag Toolbar generally would be drawn outside of the current work area, if possible. Alternatively, the Drag Toolbar may be implemented as a floating palette initially positioned near the cursor when the user initiates a drag and drop operation. This has the advantage of putting the Drag Toolbar in close proximity to the cursor if the user wants to change the drag functionality of the cursor at the outset of such an operation.

Figure 7:
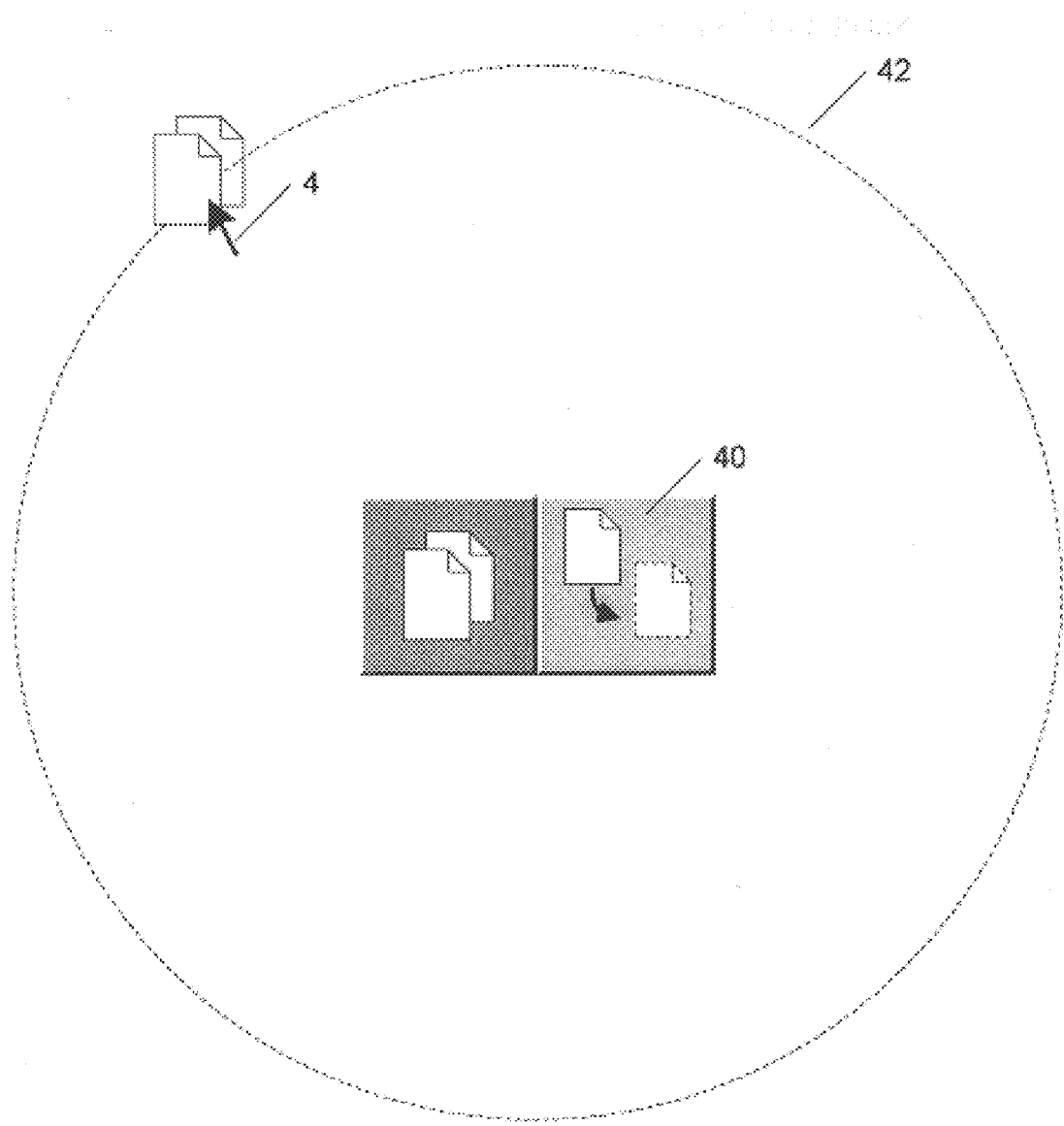
FIG. 7 is a graphical depiction of a "follow me" zone around a Drag Toolbar in accordance with the invention.

In yet another embodiment of the invention, shown in FIG. 7, a Drag Toolbar 40 is initially displayed in reasonably close proximity to the cursor 4 but has a "follow me" zone 42 which defines the bounds of a region around the Drag Toolbar 40. If the cursor 4 is within the bounds of the "follow me" zone 42, the Drag Toolbar 40 does not move. However, if the cursor 4 attempts to move past the "follow me" zone boundary 42, the Drag Toolbar 40 follows the cursor across the user's display.

The invention can be used to drag and drop objects between documents in the same application or in different applications, and for operating on files and folders or directories. The invention can be used for other applications as well. For example, when used for drawing graphics, a control point on a curve object (e.g., a Bezier curve) can be selected and dragged. A Drag Toolbar might appear showing icons such as a smooth curve going through a control point (representing continuous curvature), and a corner going through a control point (representing discontinuous curvature). Dragging the cursor through one of these control buttons can be used to change the type of function that the control point will exhibit thereafter. Thus, the invention can be used in any drawing and/or text manipulation operations that involve a drag operation. This would include dragging parts of objects, or the tool objects for making other objects.

In yet another embodiment of the invention, a Drag Toolbar can have a "clipboard" icon on which a dragged object can be temporarily dropped and "parked" if the user is not quite ready to drop the object in the current document. In this application of the invention, the Drag Toolbar may "persist" after the parking operation, so that the object can be retrieved off of the Drag Toolbar by dragging on the clipboard icon.

Alternatively, the Drag Toolbar may contain functions that change the characteristics (such as an attribute) of the dragged object when the object is dropped on a control button, allowing the user to change a characteristic, then "pick up" the changed object from the Drag Toolbar and complete the drag operation. For example, an object to be copied and rotated could be selected and then dragged to and dropped on a ROTATION control button on a Drag Toolbar. The user could then select the degree of rotation (e.g., by means of a spinner sub-control that pops-up when the object is dropped on the ROTATION control button). When done, the user would again pick up the now-rotated object and drag it to the desired drop spot. The user would know that such a mode of operation was possible because the Drag Toolbar appeared when the initial drag operation commenced, and because the control buttons are appropriately labeled and/or designated by icons.

As yet another example, when drawing lines, polygons, polylines, ellipses, etc., using line drawing functions, it is common to restrict the next point to lie on a line which is at a fixed angle (e.g., 45°) with respect to the previous point. In the prior art, this function usually requires pressing a control key, such as "SHIFT". It is also common to set a mode before drawing commences, such as restricting drawn points to snap to grid lines, vertices, edges, etc. A Drag Toolbar would allow selection of any of these functions after the drag operation commences, and even allow changing of function during different parts of the same drag operation. In a drawing mode, such added functionality is less of a conventional "drag" operation, and more of a "long gesture" comprising a series of pointer clicks, drags, and cursor transitions over various "hot spots", where each click and cursor transition can create a control point or vertex until entry of a completion gesture (e.g., pressing "ESC" or right-clicking or clicking over the first or last entered point, etc.). The Drag Toolbar thus can be used for such functions as undoing the last action entered, changing modalities (e.g., toggling "snap-to-grid" or "constrain-to-angle" functions), or otherwise making drawing more obvious.

In another embodiment, the invention provides feedback to a user about each drop site's specific options. For example, when dragging text over a non-text area of a document, the "drop content" options (i.e., "live reference" or "copied content") in the Drag Toolbar may be grayed out so that the user knows that dropping the dragged object at that location will result only in an icon (e.g., a hypertext-linked icon). In contrast, dragging text over a dialog textbox may gray out all options in the Drag Toolbar except the "copied content" option. Over a text area of a document, all options would be available. In an alternative embodiment, instead of graying out some options, some or all of the Drag Toolbar options can be replaced with other options which depend on the nature of the current target drop site.

It should be apparent that one of the principal advantages of the invention is that it provides an unambiguous way for a user to change the functionality of a cursor during a drag operation. Thus, a user need not memorize different keyboard combinations, as in the prior art. Further, the graphical user interface is not cluttered, since a Drag Toolbar only appears when a drag operation is initiated.

Implementation

Figure 8:
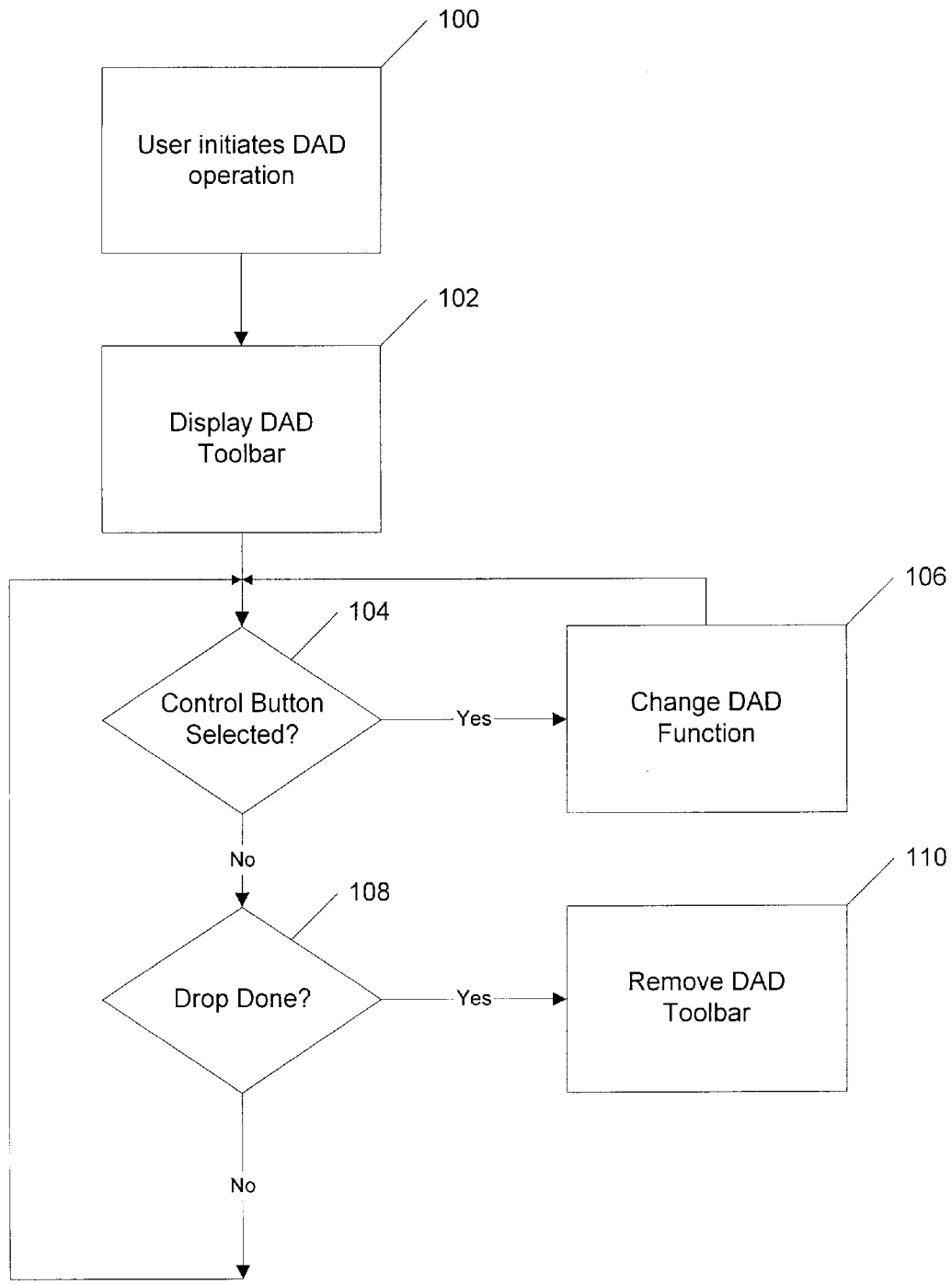
FIG. 8 is a flowchart showing one basic implementation of the invention.

FIG. 8 is a flowchart showing one basic implementation of the invention. When a user initiates a drag operation (STEP 100), the implementing system displays an associated Drag Toolbar (STEP 102). The Drag Toolbar monitors cursor events, and if the cursor selects a control button (e.g., by releasing and then re-pressing a mouse button, or simply by passing over a control button) (STEP 104), then the implementing system changes the function of the cursor to match the selected control button (STEP 106). The Drag Toolbar then continues to monitor cursor events (STEP 104).

If the cursor does not select a control button (STEP 104), the implementing system monitors whether the drag operation is done (STEP 108). If not, monitoring of cursor events continues (STEP 104). If so, the Drag Toolbar is removed (STEP 110).

Implementation of other aspects of the invention follow readily from knowledge of the basic invention. The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, while most controls for the Drag Toolbar have been describe as buttons, other types of controls may be used. Accordingly, it is to be understood that the invention is not to be limited by the specific illustrated embodiment, but only by the scope of the appended claims.

What is claimed is:

1. In a graphical user interface of a computer system, a method for changing a current function of a cursor during a drag operation on an object, including the steps of:
   (a) displaying after initiation of a drag operation, a toolbar containing at least one selectable control button, at least one control button defining an associated cursor function;
   (b) monitoring, during the drag operation, for selection by the cursor of at least one such control buttons having an associated cursor function; and
   (c) changing, during the drag operation, the current function of the cursor to the cursor function associated with at least one selected control button,
   wherein the toolbar indicates options available upon release of the dragged object for each area of the graphic user interface underlying a current position of the cursor.

2. In a graphical user interface of a computer system, a method for changing a current function of a cursor during a drag operation on an object, including the steps of:
   (a) displaying after initiation of a drag operation, a toolbar containing at least one selectable control button, at least one control button defining an associated cursor function;
   (b) monitoring, during the drag operation, for selection by the cursor of at least one such control buttons having an associated cursor function;
   (c) changing, during the drag operation, the current function of the cursor to the cursor function associated with at least one selected control button; and
   (d) removing the displayed toolbar after completion of the drag operation.

3. A method for controlling a graphical user interface of a computer system, including the steps of:
   (a) initiating a drag operation on an object by a cursor, the cursor having a current function;
   (b) displaying a toolbar containing at least one selectable control button, at least one control button defining an associated cursor function;
   (c) monitoring, during the drag operation, for selection by the cursor of at least one of such control buttons having an associated cursor function;
   (d) changing, during the drag operation, the current function of the cursor to the cursor function associated with at least one selected control button; and
   (e) applying the current function of the cursor to the object upon releasing the object,
   wherein the toolbar indicates options available upon release of the dragged object for each area of the graphic user interface underlying a current position of the cursor.

4. A method for controlling a graphical user interface of a computer system, including the steps of:
   (a) initiating a drag operation on an object by a cursor, the cursor having a current function;
   (b) displaying a toolbar containing at least one selectable control button, at least one control button defining an associated cursor function;
   (c) monitoring, during the drag operation, for selection by the cursor of at least one of such control buttons having an associated cursor function;
   (d) changing, during the drag operation, the current function of the cursor to the cursor function associated with at least one selected control button;
   (e) applying the current function of the cursor to the object upon releasing the object; and
   (f) removing the displayed toolbar after completion of the drag operation.

5. A method for controlling a graphical user interface of a computer system, including the steps of:
   (a) initiating a drag operation on an object by a cursor, the object having a current characteristic;
   (b) displaying, after initiation of the drag operation, a toolbar containing at least one selectable control button, at least one control button defining an associated object characteristic;
   (c) monitoring, during the drag operation, for selection by the cursor of at least one such control buttons having an associated object characteristic; and
   (d) applying to the object the object characteristic associated with at least one selected control button,
   wherein the toolbar indicates options available upon release of the dragged object for each area of the graphic user interface underlying a current position of the cursor.

6. A computer program, residing on a computer-readable medium, for changing a current function of a cursor during a drag operation on an object in a graphical user interface of a computer system system, the computer program comprising instructions for causing a computer to:
   (a) display, after initiation of the drag operation, a toolbar containing at least one selectable control button, at least one control button defining an associated cursor function;
   (b) monitor, during the drag operation, for selection by the cursor of at least one of such control buttons having an associated cursor function; and
   (c) change, during the drag operation, the current function of the cursor to the cursor function associated with at least one selected control button,
   wherein the toolbar indicates options available upon release of the dragged object for each area of the graphic user interface underlying a current position of the cursor.

7. A computer program, residing on a computer-readable medium, for changing a current function of a cursor during a drag operation on an object in a graphical user interface of a computer system, the computer program comprising instructions for causing a computer to:
   (a) display, after initiation of the drag operation, a toolbar containing at least one selectable control button, at least one control button defining an associated cursor function;
   (b) monitor, during the drag operation, for selection by the cursor of at least one of such control buttons having an associated cursor function;
   (c) change, during the drag operation, the current function of the cursor to the cursor function associated with at least one selected control button; and
   (d) remove the displayed toolbar after completion of the drag operation.

8. A computer program, residing on a computer-readable medium, for controlling a graphical user interface of a computer system, the computer program comprising instructions for causing a computer to:
   (a) initiate a drag operation on an object by a cursor, the cursor having a current function;
   (b) display a toolbar containing at least one selectable control button, at least one of such control button defining an associated cursor function;

(c) monitor, during the drag operation, for selection by the cursor of at least one of such control buttons having an associated cursor function;

(d) change, during the drag operation, the current function of the cursor to the cursor function associated with at least one selected control button; and (e) apply the current function of the cursor to the object upon releasing the object, wherein the toolbar indicates options available upon release of the dragged object for each area of the graphic user interface underlying a current position of the cursor.

9. A computer program, residing on a computer-readable medium, for controlling a graphical user interface of a computer system, the computer program comprising instructions for causing a computer to:

(a) initiate or drag operation on an object by a cursor, the cursor having a current function;

(b) display a toolbar containing at least one selectable control button, at least one control button defining an associated cursor function;

(c) monitor, during the drag operation, for selection by the cursor of at least one of such control buttons having an associated cursor function;

(d) change, during the drag operation, the current function of the cursor to the cursor function associated with at least one selected control button;

(e) apply the current function of the cursor to the object upon releasing the object; and (f) remove the displayed toolbar after completion of the drag operation.

10. A computer program, residing on a computer-readable medium, for controlling a graphical user interface of a computer system, the computer program comprising instructions for causing a computer to:

(a) initiate a drag operation on an object by a cursor, the object having a current characteristic;

(b) display, after initiation of the drag operation, a toolbar containing at least one selectable control button, at least one control button defining an associated object characteristic;

(c) monitor, during the drag operation, for selection by the cursor of at least one of such control buttons having an associated object characteristics; and (d) apply to the object the object characteristic associated with at least one selected control button, wherein the toolbar indicates options available upon release of the dragged object for each area of the graphic user interface underlying a current position of the cursor.

11. A drag and drop method of dynamically augmenting drag and drop functions initiated, with respect to a presently displayed object, in response to dragging of a pointing device on a graphical user interface, the method comprising the steps of:

(a) identifying a drag operation gesture of the pointing device relative to the presently displayed object; and (b) initiating a drag and drop operation in response to the drag operation gesture, the drag and drop operation including the steps of:

(1) identifying possible drag and drop functions operable on the presently displayed object;

(2) identifying among the possible drag and drop functions any initial default drag and drop functions;

(3) displaying a toolbar containing at least one of the possible drag and drop functions, including highlighting at least one of the any initial default drag and drop functions;

(4) identifying one or more of the drag and drop functions selected fro the displayed toolbar by the pointing device;

(5) designating the selected drag and drop functions as default drag and drop functions, including deselecting at least one initial default drag and drop function not presently selected; and (6) performing the currently designated default drag and drop functions on the presently displayed object upon occurrence of a drop event.

\* \* \* \* \*